(12) United States Patent
De Koning

(10) Patent No.: US 8,939,487 B2
(45) Date of Patent: Jan. 27, 2015

(54) GRIPPING DEVICE

(75) Inventor: Abraham Gijsbert De Koning, Zegveld (NL)

(73) Assignee: Pex Rent B.V., Zegveld (NL)

( * ) Notice: Subject to any disclaimer, the term of this patent is extended or adjusted under 35 U.S.C. 154(b) by 54 days.

(21) Appl. No.: 13/702,856

(22) PCT Filed: Jun. 7, 2011

(86) PCT No.: PCT/NL2011/050403
§ 371 (c)(1),
(2), (4) Date: Feb. 27, 2013

(87) PCT Pub. No.: WO2011/155826
PCT Pub. Date: Dec. 15, 2011

(65) Prior Publication Data
US 2013/0154293 A1  Jun. 20, 2013

(30) Foreign Application Priority Data

Jun. 7, 2010 (NL) ..................................... 2004830

(51) Int. Cl.
*B66C 1/42* (2006.01)
*B25J 15/00* (2006.01)
(Continued)

(52) U.S. Cl.
CPC .............. *B25J 15/0028* (2013.01); *B25J 15/02* (2013.01); *B25J 15/0475* (2013.01); *Y10S 901/36* (2013.01); *Y10S 901/31* (2013.01)
USPC .............................. 294/119.1; 901/31; 901/36

(58) Field of Classification Search
CPC . Y10S 294/902; Y10S 294/907; B66C 1/422; B25B 9/00; B25J 15/0616; B25J 15/0009; B25J 15/0253; B25J 15/0206; B65G 47/90

USPC .................. 294/2, 106, 115, 207, 119.1, 902; 901/31, 32, 37, 39
See application file for complete search history.

(56) References Cited

U.S. PATENT DOCUMENTS 3,139,302 A * 6/1964 Orloff et al. .................. 294/198
4,042,122 A * 8/1977 Espy et al. ..................... 414/728
(Continued)

FOREIGN PATENT DOCUMENTS

DE  10 2005 058 312 A1  6/2007
DE  10 2006 052 902 A1  5/2008

OTHER PUBLICATIONS

International Preliminary Report on Patentability issued to International Application No. PCT/NL2011/050403, mailed Sep. 18, 2012.
(Continued)

*Primary Examiner* — Stephen Vu
(74) *Attorney, Agent, or Firm* — Hoffmann & Baron, LLP

(57) ABSTRACT

A gripping device (4) is attached to a robot arm (2). The gripping device (4) consists of a housing (6) and two gripping finger sockets (9,10) which can be displaced linearly with respect thereto. Each gripping finger socket (9, 10) is provided with an electric or pneumatic coupling for various gripping fingers (17, 27, 37) that can be connected. A rotating drive (13) is present between the gripping finger sockets (9, 10) on which a tool can be placed for releasing or attaching a fastening apparatus, such as a bolt. With this relatively simple construction, weights of several hundred kilos can be lifted and positioned accurately, for example in a processing machine.

9 Claims, 8 Drawing Sheets

(51) Int. Cl.
*B25J 15/02* (2006.01)
*B25J 15/04* (2006.01)

(56) References Cited

U.S. PATENT DOCUMENTS 4,819,978 A * 4/1989 Scheinman et al. ....... 294/119.1
5,163,729 A * 11/1992 Borcea et al. .............. 294/119.1
5,184,861 A 2/1993 Voellmer
5,360,249 A 11/1994 Monforte et al.
5,562,320 A * 10/1996 Bloomberg et al. ....... 294/119.1

OTHER PUBLICATIONS

International Search Report for International Application No. PCT/NL2011/050403.

* cited by examiner

GRIPPING DEVICE

CROSS-REFERENCE TO RELATED APPLICATIONS

The present application is the National Stage filing of International Application No. PCT/NL2011/050403, filed Jun. 7, 2011, which claims the benefit of NL 2004830, filed Jun. 7, 2010, the entire contents of all of which are incorporated by reference herein.

FIELD OF THE INVENTION

The present invention relates to a gripping device comprising a housing provided with a connection for attachment to a robot arm.

BACKGROUND OF THE INVENTION

In the prior art, various types of gripping devices are known which are used in combination with a robot arm for picking up and displacing objects.

In order to automate the processing of workpieces in the case of medium/large series, specially adapted attachments for robot arms are known, by means of which relatively heavy products, such as workpieces which may possibly, together with the clamping devices and the like, weigh tens to hundreds of kilos can be displaced. Such gripping devices are specifically designed for the object to be displaced. This is particularly true of the shape of the gripping fingers. As a result thereof, such gripping devices can only be used for producing medium/large series.

Until now, small series, that is to say of for example 5-100 pieces, have been positioned in processing stations partly by hand. In this case, it has become customary to feed the various products automatically to the various processing machines, but changeovers still require human intervention. Another example of a complicated operation is the re-setting of objects for which PCT application PCT/NL2009/050587 offers a solution. Another complicated step is the changeover from one product to another product. In practice, it appears that the product changeover often has to be carried out manually. Another problem occurs in the case of castings and/or freely formed parts. For this purpose, expensive automatic clamping devices for automatic loading have been developed and for this reason, clamping is carried out manually in the case of small series.

U.S. Pat. No. 5,184,861 discloses a gripping device, wherein the gripping fingers are rigidly connected with a slide and can be moved to each other, from each other respectively.

The extremities of the gripping fingers are provided with rollers, wherein between an auxiliary part with a defined shape can be received, wherein a further object can be arranged on the auxiliary part which can be manipulated with a tool being between the gripping fingers.

DE 10 2005 058312 discloses part of a robot arm which can be drifted over a limited angle.

SUMMARY OF THE INVENTION

It is an object of the present invention to provide a gripping device by means of which it is possible to pick up various kinds of workpieces using gripping fingers which may or may not have been specially adapted to carry out particular operations thereon, such as positioning, fixing and the like. It has to be possible to use such a gripping device as universally as possible so that a change in the objects to be processed does not necessitate a different gripping device.

This object is achieved by a gripping device comprising a housing, which housing is provided with a connection for attachment to a robot arm, in which said housing is provided with two gripping finger sockets which can be displaced with respect to said housing and with respect to one another in a controlled manner, gripping fingers provided in each of said gripping finger sockets and a rotating drive which is fitted to the housing, which rotating drive comprises a coupling part.

According to the present invention, the combination of gripping finger sockets into which exchangeable gripping fingers can be fitted and a rotating drive is provided. By means of the rotating drive, it is possible to fix or release various kinds of objects, such as clamping elements and the like, while the respective objects are meanwhile being securely held by the gripping fingers and can be displaced. Due to the fact that the gripping fingers can be removed from the gripping finger sockets, it is possible to use different gripping fingers, depending on the desired object to be processed.

Although the invention is described here with reference to a processing installation, it should be understood that other actions can also be performed by means of the gripping device described here.

By means of the present invention, it is readily possible to achieve a gripping device by means of which a wide range of operations can be performed on a wide range of products at relatively low costs, which promotes its acceptance.

According to an advantageous embodiment of the invention, the coupling part of the rotating drive can be moved in translation in the direction of the rotation axis. Various tools can be connected to said coupling part by means of which various fastening means, such as bolts, can be tightened and/or loosened. Due to the ability to move in translation, it is possible, for example in the inserted position, for the gripping device to grip an object with the gripping fingers and only then to place a tool on an accessible fastening means, such as a bolt, after which the respective bolt can be loosened or tightened.

A particularly simple construction can be achieved if the coupling part is situated between the gripping fingers. It can be simplified even further if the gripping finger sockets only carry out a linear movement towards one another or away from one another. In combination with the robot arm to which the gripping device can be connected according to a particular variant of the invention, it is possible to realise any position of a gripping finger. The gripping fingers are preferably replaceable in a simple way and to that end connectable in a fixed position with the gripping finger sockets. Connecting can be effected electrically, pneumatically or hydraulically and possibly with several combinations thereof. By means of the gripping device, the gripping fingers can be moved to a storage position where they are fixed in a direction, for example by hook attachment or the like, and by uncoupling the coupling, the gripping finger can be separated from the gripping finger socket. Subsequently, the gripping finger sockets with the gripping device can be moved to another position where further gripping fingers are present. The gripping fingers can be constructed as two separate parts of the most different shape in order to be able to grip workpieces of different appearance. If a pallet is used, it is possible to provide this with two projecting parts which match the coupling part of the gripping fingers and can be accommodated in the gripping finger sockets and coupled thereto.

Using the present invention, it is possible to displace significant weights, that is to say 150 kg or more, without requiring a robot, which is only suitable for one purpose.

In order to find and approach an object and for other movements of the gripping device, a vision system may be present in the housing and be coupled to a control unit which influences the movement thereof. In the respective software, which may be provided externally, the shape of the object to be approached may be stored, thus making it possible to approach and grip the object in an optimum manner. Such a vision system may consist of a camera, optionally in combination with a laser. Such a camera may be a two-dimensional or three-dimensional camera.

The movement of the gripping finger sockets towards one another is preferably controlled by means of a servomotor. This also makes it possible to determine the force, position and speed with which the gripping fingers attached thereto grip an object (for example by means of the passage of current). In this way it is possible to engage objects with different sizes and shape. The rotating drive is preferably also effected by means of a servomotor and the torque transmitted thereby can also be determined in the same manner. In addition, it is possible to incorporate separate force sensors between the robot arm and the gripping device, as a result of which the weight lifted by the gripping device can be determined and the pressure exerted on the gripping fingers can be measured.

Rotating the coupling part in the above-described manner can be used in combination with rotating the gripping device by means of the robot arm. In general, the rotation of the robot arm will be limited due to the cables and the like which are connected to the gripping device. However, it is thus possible to exert a much greater force than by means of the rotating drive for the coupling part.

This means that it is possible, by means of the robot arm, to exert a relatively large force through a relatively limited rotation angle. This is important when objects have to be additionally secured or initially released. Obviously, it is important in this case that when rotating the robot arm with the gripping device, the coupling part is non-rotatable with respect to the gripping device. This can be achieved by driving the coupling part via a self-locking construction by means of the respective (servo) motor, for example by a worm with a spiral wheel.

The present invention also relates to a method for fixing an object with respect to a further object, which object is provided with rotating fastening means, comprising gripping said object with said gripping fingers using the assembly, positioning said object with respect to the further object, fixing said object in the desired position by means of the rotating drive of said gripping device, followed by moving said gripping fingers away from said object.

The invention will be described in more detail below with reference to exemplary embodiments illustrated in the drawing. It should be understood that the invention has numerous other uses in addition to those shown in these examples.

DETAILED DESCRIPTION OF THE INVENTION

Figure 1:
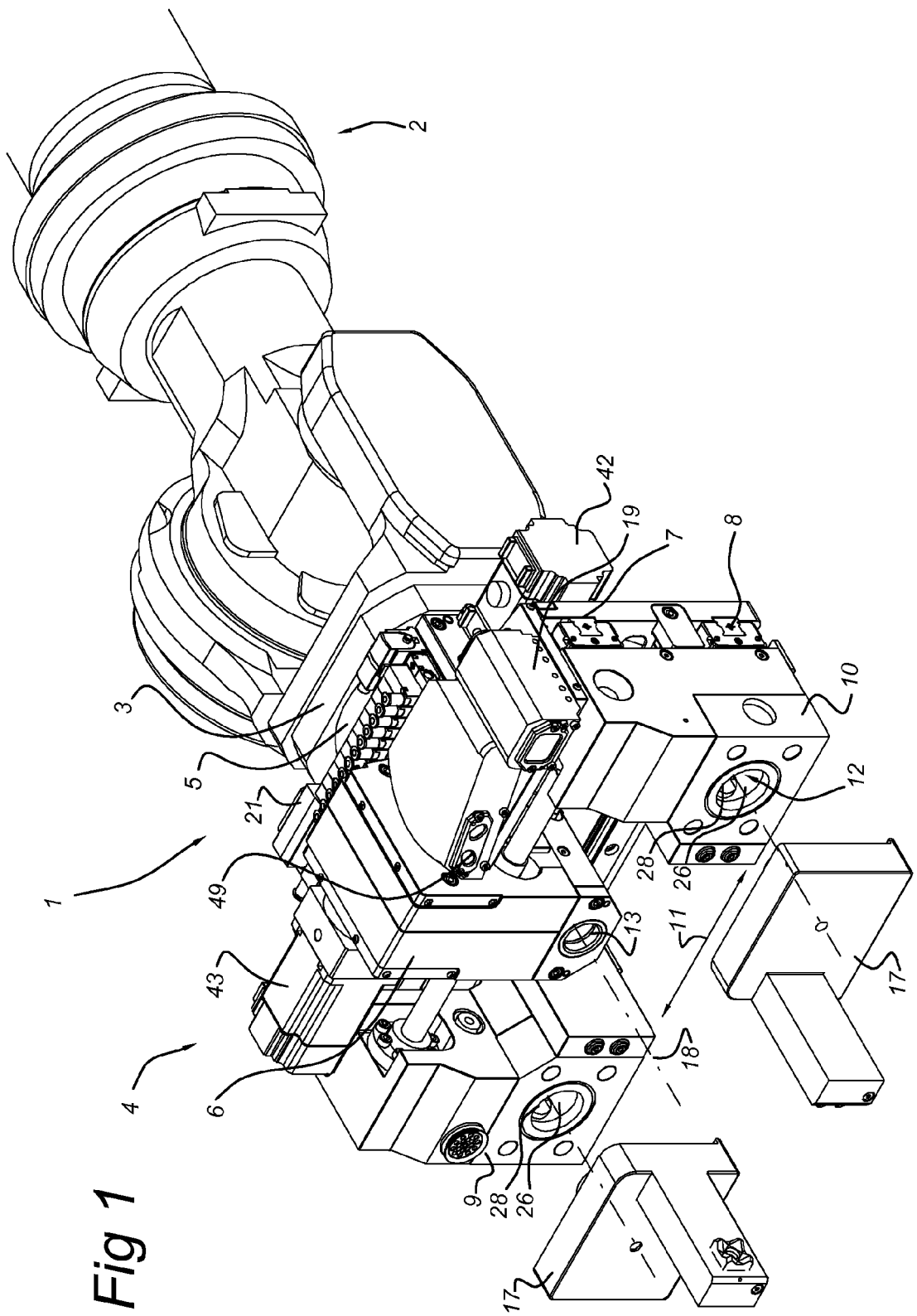
FIG. 1 diagrammatically shows a perspective view of a gripping device according to the invention and a part of a robot arm.

In FIG. 1, the assembly consisting of a robot arm 2 and the gripping device 4 according to the invention is denoted overall by reference numeral 1. The gripping device 4 is provided with a housing 6 having a connection 5. A conventional coupling 3 is present between the robot arm 2 and the connection 5.

The robot arm 2 is only partly illustrated in order to emphasize that the robot arm can be any construction known in the prior art.

The housing 6 is provided with two guides which are denoted by reference numerals 7 and 8. These guides are designed as linear guides and gripping finger sockets 9 and 10 can be displaced along them. The displacement is achieved by means of motors and more particularly by servomotors or other motors, in which the position of the gripping finger socket with respect to the housing can be determined accurately. According to a particularly simple embodiment of the invention, the movement of the gripping finger sockets 9 and 10, which is carried out according to arrow 11, are coupled to one another, so that a single motor 43 suffices in order to move the gripping finger sockets 10 towards one another or away from one another.

Figure 3:
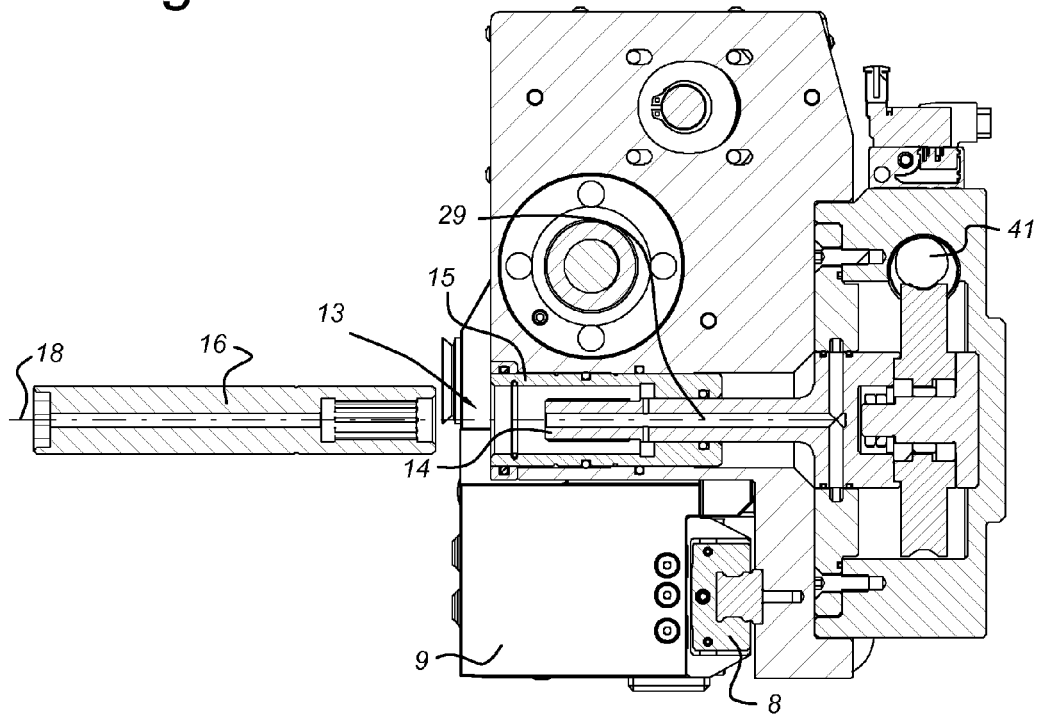
FIG. 3 shows a cross section of the gripping device along III from FIG. 2.

A rotating drive 13 (see also FIG. 3), consisting of a rotationally driven part 14 and a stationary sleeve 15 surrounding it, is present between the gripping finger sockets 9 and 10. Rotationally driven part 14 is made to rotate, either to the left or to the right, by a servomotor 42 with worm 41 and in this case at least one of the directions of rotation is torque-driven, that is to say the maximum force of rotation which is applied can be controlled by means of software. Sleeve 15 can be moved to and fro in the direction of the rotation axis 18. By way of example, a value of 15 mm is given for the stroke for the sleeve which can be moved in translation. This movement is a pneumatically controlled movement which may be achieved by a piston-cylinder (not shown) (in which sleeve 15 may be part of the piston) present in the housing 6 and the associated control unit. Sleeve 15 is designed to hold different kinds of tools and at reference numeral 16 an example thereof is shown. By means of a click-fit connection, the tool 16 can be held in the sleeve 15 and be rotationally driven via corresponding toothing. By gripping the tool 16 at the free end and moving the gripping device (or sleeve 15) away, such a click-fit connection can be released again in a simple manner. Such gripping may, for example, include attaching the tool behind any construction.

In addition, it is possible to introduce a fluid, such as air, through the bore 29 in the rotationally driven part 14 and thus the sleeve which can be moved in translation. Using air pressure produces an additional spring action in addition to that of the sleeve 15, as a result of which, for example, tool 16 can resiliently be pushed against a bolt head. At low rotation, the tool subsequently grabs the respective bolt head. The same applies to the return movement of the tool, where active withdrawal takes place. In addition, the resilient action makes it possible to push an object against another object using a certain pneumatically controlled resilience.

In FIG. 1, gripping fingers 17 are shown which can be placed into the openings 26 of the gripping finger sockets 10. The ends of the gripping fingers 17 are designed to cooperate with a coupling 12 behind the opening 26 in each of the gripping finger sockets. The illustrated example shows a construction with a cone in which such a cone can be fixed on the end of the gripping fingers 17 in a single fixed non-rotatable position by means of pins 28 in the gripping finger sockets. Such pins can be actuated electrically or pneumatically.

Since such a construction with a cone does not ensure non-rotatability of the gripping fingers with respect to the gripping finger sockets, further parts may be present which fix the rotation position of the gripping fingers with respect to the gripping finger sockets. This may be centring pins, stop faces and the like.

The control unit for the various functions is denoted by reference numeral 21 and not shown in any more detail. A vision system consisting of a camera 19 and a laser 49 is present. The camera is preferably a 2D camera which, in combination with the laser, forms a 3D system. The software which this requires is preferably stored externally (PC). By means of this vision system, it is possible to control finding and approaching an object by the gripping device. The clamping force of the gripping fingers is determined by means of the servomotor.

Figure 2:
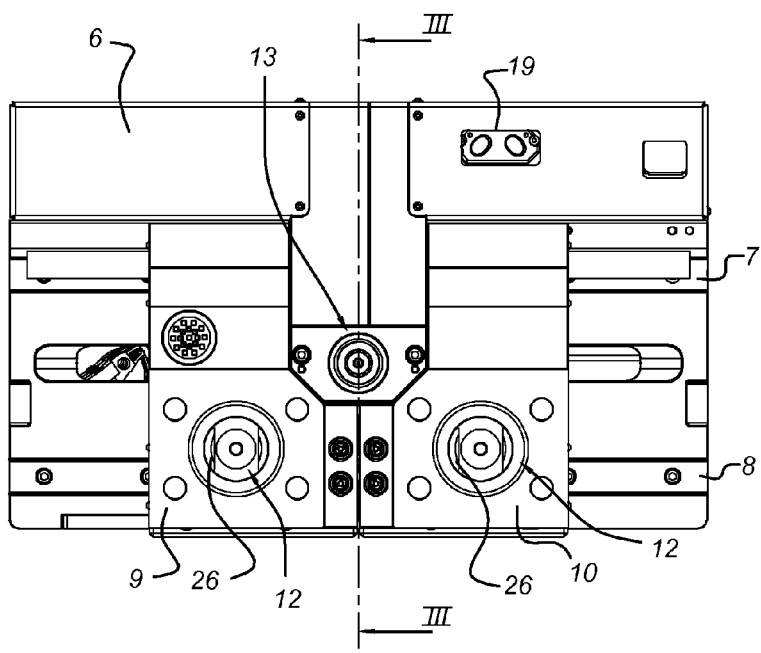
FIG. 2 shows a front view of the gripping device from FIG. 1 in which the position of the gripping finger sockets has been changed compared to FIG. 1.

FIG. 2 shows the completely closed position of the two gripping finger sockets, that is to say the position in which they abut.

Figure 4A:
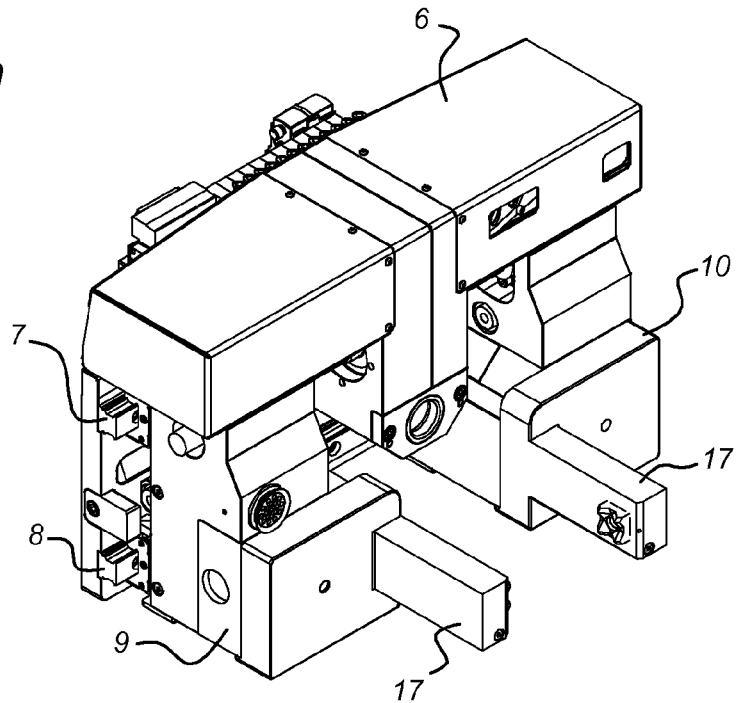
FIGS. 4a, b show a first use of the gripping device according to the invention.
Figure 4B:
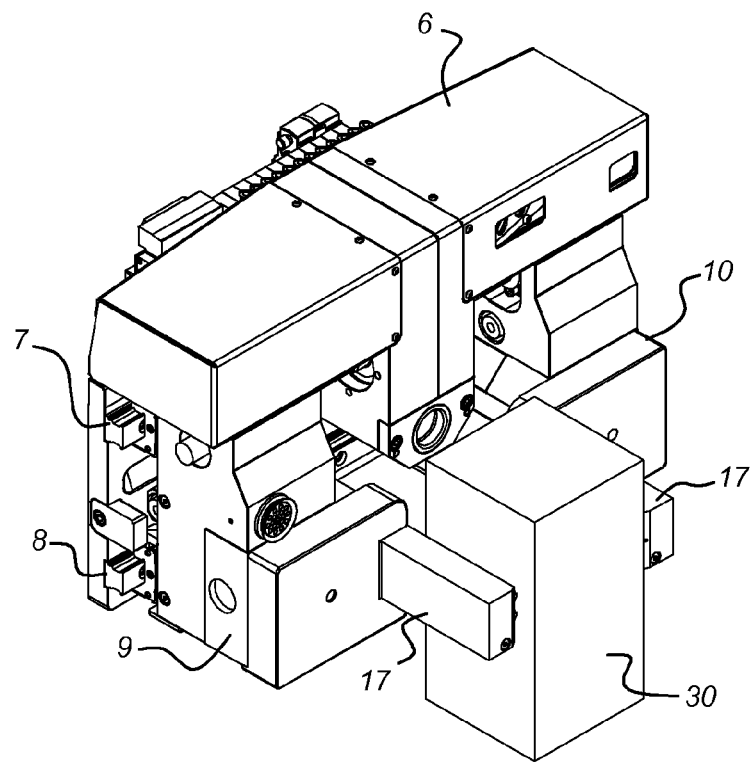

In FIG. 4 and further, examples of use of the present invention are shown.

FIGS. 4a and b show the clamping of an object 30. To this end, specifically designed gripping fingers 17 are used.

Figure 5A:
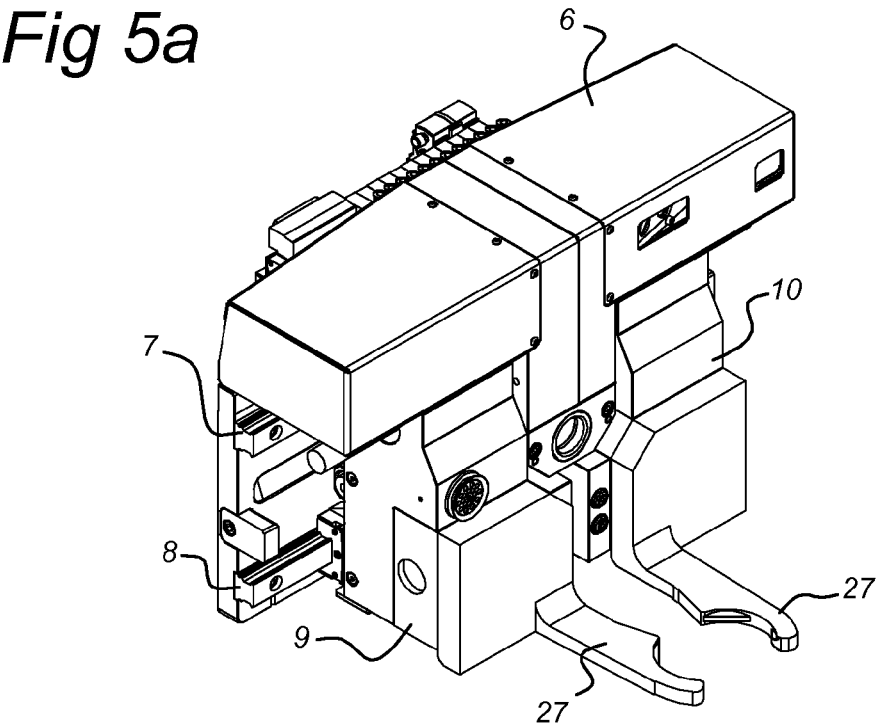
FIGS. 5a, b show a further use of the gripping device according to the invention.
Figure 5B:
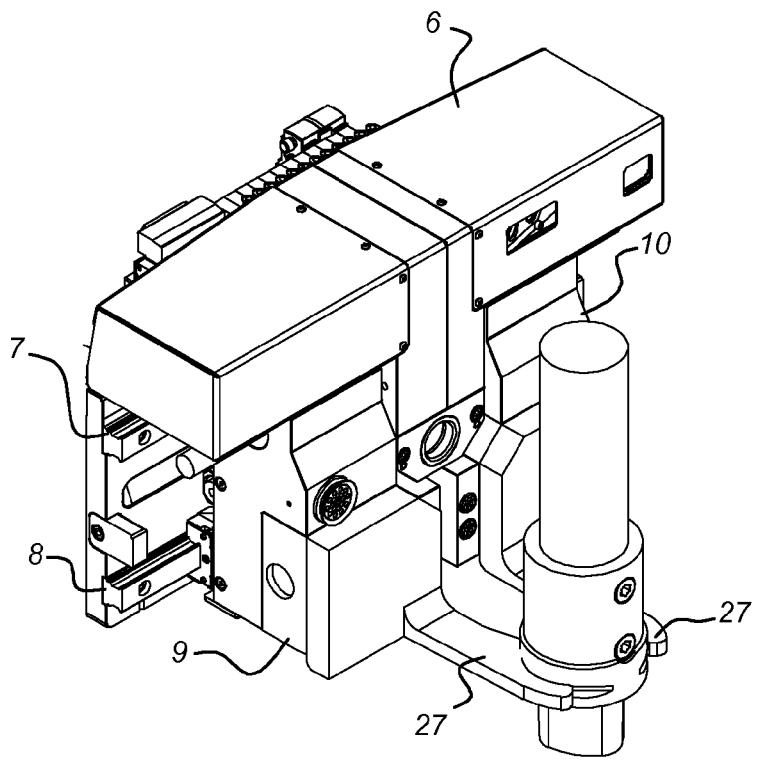

FIG. 5 shows a variant in which different gripping fingers 27 are used. Changing the gripping fingers can be effected in a simple manner by moving the gripping device with the gripping fingers to a storage position in which a displacement direction of the gripping fingers is blocked (by hooking, latching and the like). By then releasing the coupling 12, the respective gripping finger can be released and another gripping finger can be positioned. Preferably, the construction is such that the gripping finger can only be positioned in one position with respect to the socket and it is possible to achieve a particularly high degree of accuracy with the present invention, so that the gripping finger is fixed only in a position with an accuracy of hundredths of millimetres with respect to the gripping finger socket.

Figure 6A:
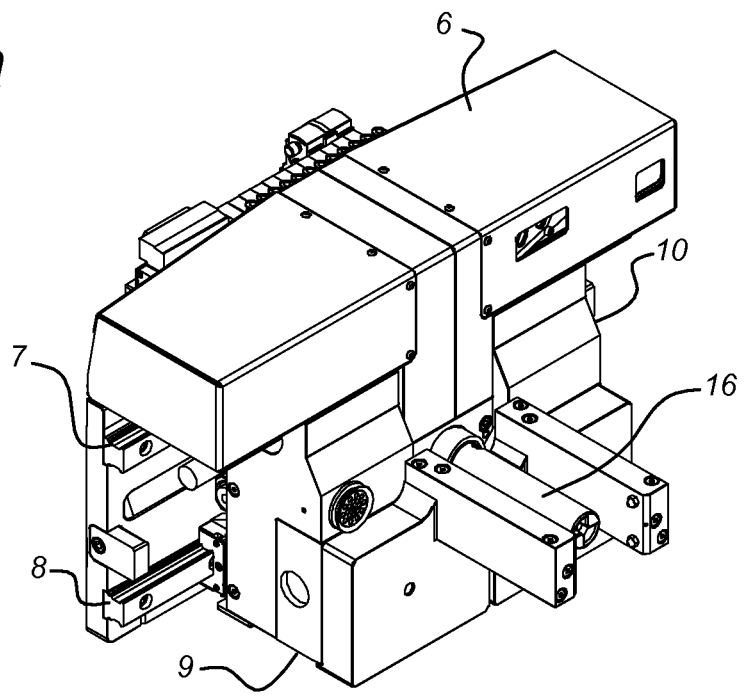
FIGS. 6a, b show a further use of the gripping device according to the invention.
Figure 6B:
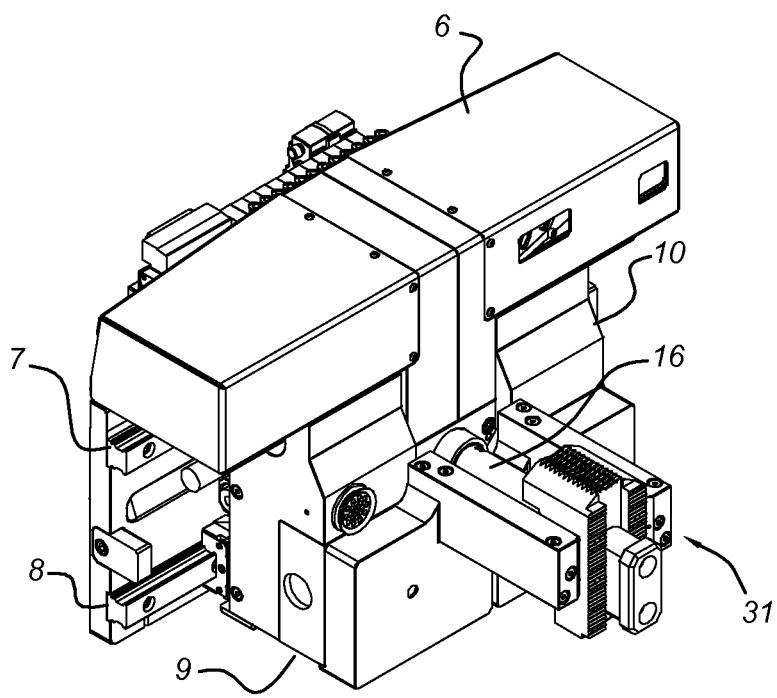

FIGS. 6a, b show how an object 31 is clamped, in which a bolt or the like has to be screwed down by means of the tool 16. When approaching the respective object, the tool 16 is held in a position in which it is as much as possible inside the housing 6, as a result of which the gripping fingers are free to clamp the object 31. Once the desired clamping has taken place, the tool 16 which can be moved in translation can be moved out in order to carry out the respective tightening or loosening. Before complete engagement of the respective bolt or the like takes place, the tool 16 is pneumatically pushed against the bolt head or the like and, after a few rotations around the bolt head, falls into a cavity. Since the resistance against rotation then quickly increases, the servomotor for the rotation of the bolt detects that engagement has taken place and the desired torque can be applied. During unscrewing, the displacement of the sleeve creates the necessary free space.

Figure 7:
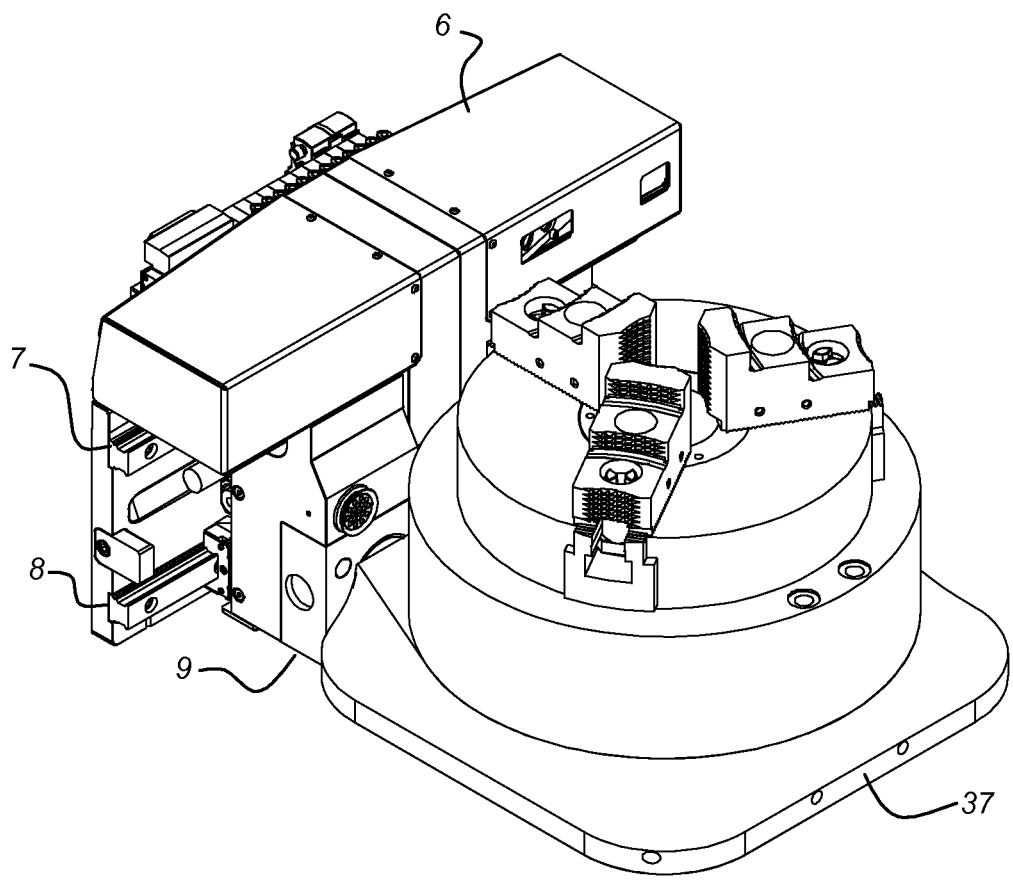
FIG. 7 shows a further use of the gripping device according to the invention.

FIG. 7 shows a pallet 37 which is provided with two coupling parts (not clearly visible) which match the gripping fingers. By means of the gripping device according to the present invention, relatively heavy objects placed on the pallet 37, such as the chuck illustrated here, can readily be displaced.

Figure 8A:
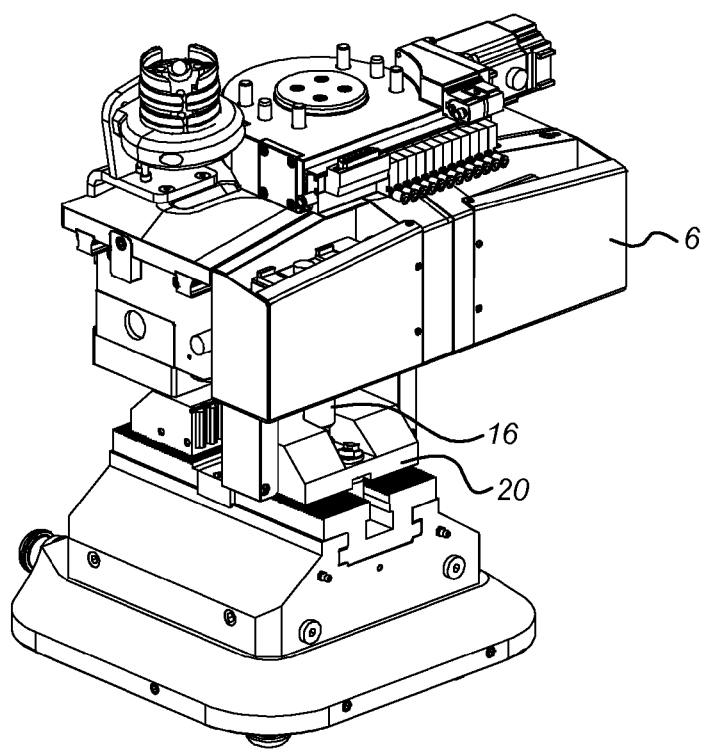
FIGS. 8a, b show a further use of the gripping device according to the invention.
Figure 8B:
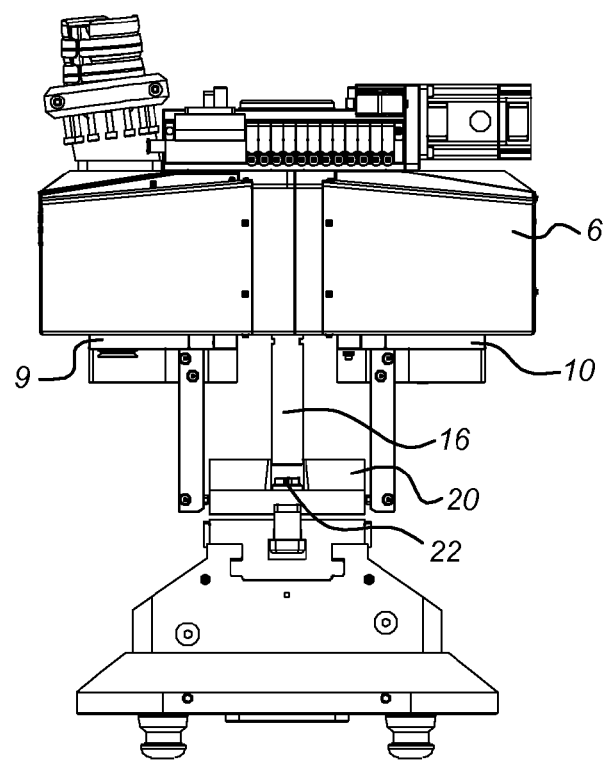

FIG. 8 shows the gripping of the gripping jaws 20. These can be placed in the desired position by the gripping fingers in which case it is moreover possible, if an object to be clamped is present, to pretension the gripping jaws towards one another using the gripping fingers into a discrete position which is determined, for example by toothing. Subsequently, this position of the gripping jaws for fixing the bolt 22 is fixed by means of the tool 16.

Figure 9:
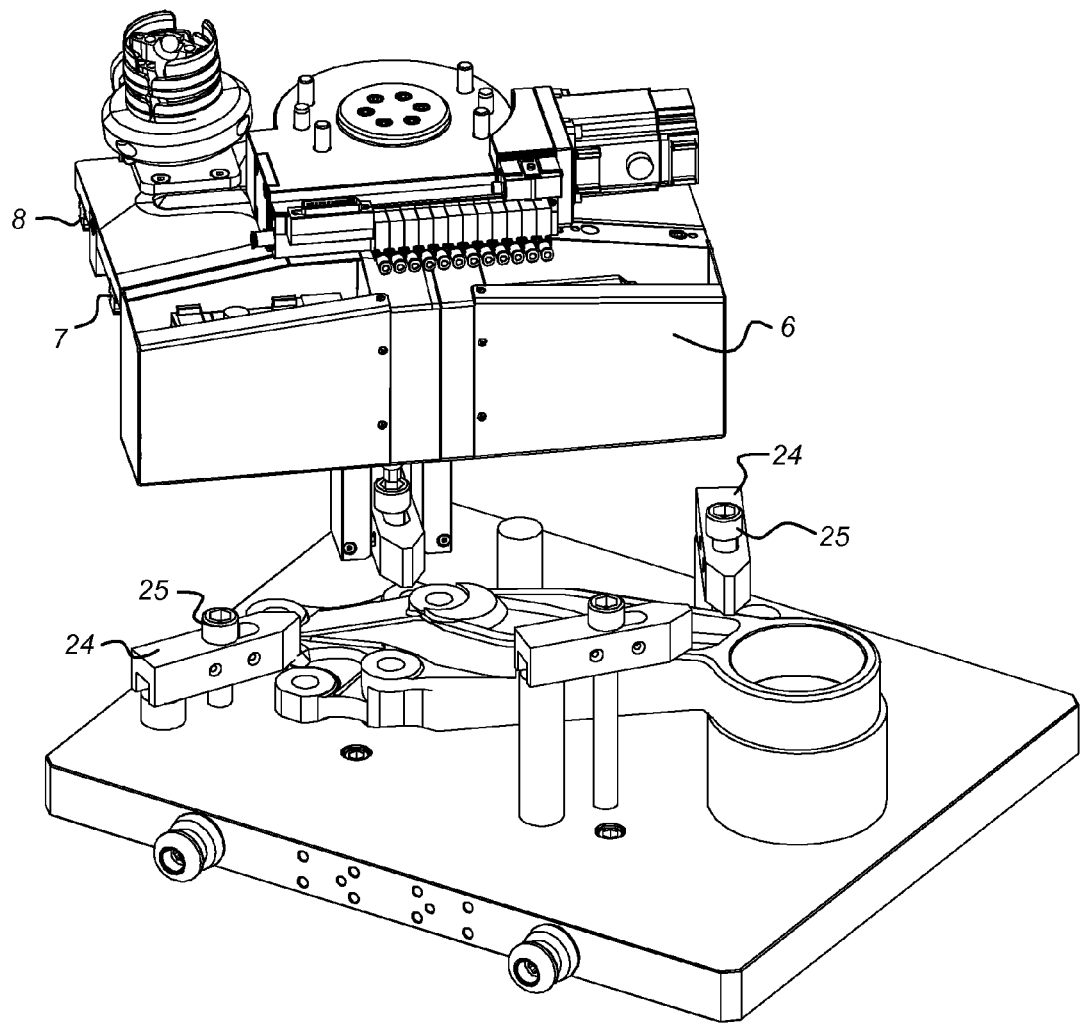
FIG. 9 shows a further use of the gripping device according to the invention.

Finally, FIG. 9 shows the clamping of an object by means of a clamping element 24 and bolt 25. In this case as well, it is possible to achieve such a clamping by means of the universal gripping device according to the present invention without many other measures. Only the gripping fingers and/or the tool have to be adjusted in such a case.

By means of the gripping device according to the present invention, it is possible to grip many kinds of objects and clamp and/or position them at the desired pretension and to then fix or release them by means of the rotating drive. Using the invention, it is possible to place relatively heavy objects without a defined position with a high degree of accuracy. The weight of the gripping device itself is relatively low and by way of example, a weight of less than 35 kilos is mentioned.

The above examples show that numerous uses are conceivable in which the present invention can be used advantageously.

The invention claimed is:

1. A gripping device (4) comprising a housing (6) provided with a connection (5) for attachment to a robot arm (2), in which said housing is provided with two gripping finger sockets (9, 10) which can be displaced with respect to said housing and with respect to one another in a controlled manner, gripping fingers (17, 27, 37) provided in each of said gripping finger sockets (9, 10) and a rotating drive (13) which is fitted to the housing (6), said rotating drive comprises a coupling part (15) that can be moved in translation in the direction of a rotational axis (18) and is arranged for connecting various tools that can tighten or loosen fastening means, and wherein said gripping finger sockets are provided with a pneumatic, electric or hydraulic coupling for locking or releasing said gripping fingers that are replaceable and connectable in a fixed position with respect to the gripping finger sockets; wherein said coupling part (15) is arranged between said gripping fingers (17, 27, 37).

2. The gripping device according to claim 1, in which said housing is provided with a linear guide (7, 8) for said gripping finger sockets.

3. The gripping device according claim 1, in which said rotating drive (13) is of a self-locking (41) design.

4. The gripping device according to claim 1, in which at least said gripping finger sockets of said device are designed for loads of at least 150 kg.

5. The gripping device according to claim 1, in which said housing is provided with a 3D vision system and a control unit is present for finding and approaching objects.

6. The gripping device according to claim 1, in which said gripping fingers are driven by a common servomotor (43).

7. The gripping device according to claim 1, wherein said gripping finger sockets are displaceable controlled through position, force and/or speed.

8. The gripping device according to claim 1, wherein said gripping finger sockets are displaceable with a servo motor.

9. An assembly comprising the gripping device (4) according to claim 1, wherein the gripping device (4) is attached to said robot arm.

\* \* \* \* \*